(12) United States Patent
Veale (10) Patent No.: US 6,584,470 B2
(45) Date of Patent: Jun. 24, 2003

(54) MULTI-LAYERED SEMIOTIC MECHANISM FOR ANSWERING NATURAL LANGUAGE QUESTIONS USING DOCUMENT RETRIEVAL COMBINED WITH INFORMATION EXTRACTION

(75) Inventor: Richard A. Veale, Addison, TX (US)

(73) Assignee: Intelliseek, Inc., Cincinnati, OH (US)

( * ) Notice: Subject to any disclaimer, the term of this patent is extended or adjusted under 35 U.S.C. 154(b) by 299 days.

(21) Appl. No.: 09/796,961

(22) Filed: Mar. 1, 2001

(65) Prior Publication Data

US 2002/0188586 A1 Dec. 12, 2002

(51) Int. Cl.[7] .............................. G06F 7/00; G06F 17/00
(52) U.S. Cl. ............................................ 707/102; 707/3
(58) Field of Search ...................................... 707/102, 3

(56) References Cited

U.S. PATENT DOCUMENTS

| | | | |
|---|---|---|---|
| 5,519,608 A | 5/1996 | Kupiec | |
| 5,696,962 A | 12/1997 | Kupiec | |
| 5,836,771 A | 11/1998 | Ho et al. ........................ | 434/362 |
| 5,884,302 A | 3/1999 | Ho .................................. | 707/3 |
| 5,924,094 A * | 7/1999 | Sutter ............................ | 707/10 |
| 6,233,575 B1 * | 5/2001 | Agrawal et al. ............... | 707/6 |
| 6,434,549 B1 * | 8/2002 | Linetsky et al. ............... | 707/3 |

OTHER PUBLICATIONS

Aliod, Diego Mollá, et al., "A Real World Implementation of Answer Extraction", Department of Computer Science, University of Zurich, Winterthurerstr. 190, CH–8057 Zurich, Switzerland, pp. 1–6.

Bishop, Mike, "ARROW Question/Answering Systems", Language Computer Corporation, 1999, pp. 1–3.

Harabagiu, Sanda M., "An Intelligent System for Question Answering", University of Southern California; Modlovan, Dan, Southern Methodist University, pp. 1–5.

Lenz, Mario, et al., "Question Answering with Textual CBR", Department of Computer Science, Humboldt University Berlin, D–10099 Berlin, pp. 1–12.

Katz, Boris, "From Sentence Processing to Information Access on the World Wide Web: START Information Server", MIT Artificial Intelligence Laboratory, Feb. 27, 1997.

Voorhees, Ellen M., "The TREC–8 Question Answering Track Report", National Institute of Standards and Technology, pp. 1–6.

Harabagiu, Sanda M. et al., "Experiments with Open–Domain Textual Question Answering", Department of Computer Science and Engineering at Southern Methodist University, pp. 1–7.

Harabagiu, Sanda M. et al., "Mining Textual Answers with Knowledge–Based Indicators", Department of Computer Science and Engineering at Southern Methodist University, pp. 1–5.

Modlovan, Dan et al., "LASSO: A Tool for Surfing the Answer Net", Department of Computer Science and Engineering at Southern Methodist University, pp. 1–9.

* cited by examiner

Primary Examiner—Safet Metjahic
Assistant Examiner—Cindy Nguyen
(74) Attorney, Agent, or Firm—Taft, Stettinius & Hollister LLP (57) ABSTRACT

A system and method are provided for processing a document containing multiple words to extract an answer. The method uses a set of signatures and signature based rules. Each rule includes a name formed by concatenating the signatures included in the rule and a concept which is assignable to the combination of signatures included in the rule. The method parses the words and assigns a signature to each of them. It may also assign a window which includes a parameter defining the number of signatures viewable at one time. The window may be moved so that the window reveals signatures not viewable in its previous position. The signatures viewable in the window are read and a rule name is created by concatenating the signatures. The created rule name is compared to the names of the rules and, if the created name matches any of the rule names, the matching rule is applied to create a concept and the concept is assigned back into the window.

20 Claims, 4 Drawing Sheets

MULTI-LAYERED SEMIOTIC MECHANISM FOR ANSWERING NATURAL LANGUAGE QUESTIONS USING DOCUMENT RETRIEVAL COMBINED WITH INFORMATION EXTRACTION

FIELD OF THE INVENTION

This invention relates generally to computer software and, more specifically, to a system and method for information extraction.

BACKGROUND

Personal computers or workstations may be linked in a computer network to facilitate the sharing of data, applications, files, and other resources. One common type of computer network is a client/server network, where some computers act as servers and others as clients. In a client/server network, the sharing of resources is accomplished through the use of one or more servers. Each server includes a processing unit that is dedicated to managing centralized resources and to sharing these resources with other servers and/or various personal computers and workstations, which are known as the "clients" of the server.

Computers often need to retrieve information requested by a user. The information may be available locally or may be available on another computer, such as a server, through a network. Retrieving information is relatively simple when the user wishes to retrieve specific information which the user knows to exist and when the user knows relevant parameters about the information to be retrieved such as a document name, an author, or a directory name. However, when the user wishes to retrieve information and has no knowledge of where it might be located or in what document it might be contained, more sophisticated information retrieval ("IR") techniques are necessary.

IR systems use a search query, input by a user, to locate information which satisfies the query and then return the information to the user. Simple IR systems may use the original query, while more advanced systems may modify the query by adding parameters or changing its format. IR systems may be limited to searching a specific database accessible to the system or they may be enabled to search any available information, such as that located on the Internet. Successfully searching unstructured information such as that available on the Internet generally demands a more flexible IR system, since users have no knowledge of how the information for which they are looking might be indexed and stored.

However, flexible IR systems are difficult to develop. Part of this difficulty stems from the inherent complexity of natural languages, which operate on several different levels of meaning simultaneously. Five of the levels of meaning are the morphological, syntactic, semantic, discourse, and pragmatic levels.

The morphological level focuses on a morpheme, which is the smallest piece of a word that has meaning. Morphemes include word stems, prefixes and suffixes. For example, "child" is the word stem for "childish" and "childlike."

The syntactic level focuses on the structure of a sentence and the role each word plays in the structure. This level includes the relationship that each word has to the other words in the sentence. For example, the position of a word in a sentence can give valuable insight as to whether the word is the subject of the sentence or an action.

The semantic level focuses not only on the dictionary meaning of each individual word, but also on the more subtle meaning that is derived from the context of the sentence. For instance, the meaning of the word "draw" can change depending on the context in which it is used. To "draw a picture" and to "draw a sword" both use the action "draw," but in very different ways which are made clear by examining the context provided by the related words.

The discourse level examines a document's structure as a whole and derives further meaning from that structure. For example, technical documents usually begin with an abstract, while newspaper articles generally contain important "who, what, where, when" information in the first paragraph. This structure helps identify the type of document being examined, which in turn aids in determining where certain information in the document might be located and how the information might be organized.

The pragmatic level focuses on a body of knowledge that exists outside the document itself but is not actually reflected in the document. For instance, attempting to discover the current status of the European Currency Unit in different countries assumes a knowledge as to what countries in Europe are taking part in the implementation process, even if those countries are not specifically named in a document.

The levels of meaning operate simultaneously to provide the natural language environment in which communication occurs. Attempts at implementing the different levels of meaning for IR purposes have resulted in three basic types of systems, which may be generally categorized as boolean, statistical/probabilistic, and natural language processing ("NLP"). Many IR systems use a combination of these three basic types.

Boolean systems use basic boolean operators such as "AND" and "OR," which are implemented mathematically to obtain search results. An example of this is a boolean search for "information AND retrieval," which will return documents which contain both "information" and "retrieval." Documents which do not contain both words are ignored by the system. In contrast, a search for "information OR retrieval" will return documents which contain either or both of the words "information" and "retrieval," and so is a less restrictive search than one utilizing the "AND" operator.

Statistical/probabilistic systems use statistical and probabilistic analysis to aid a user in a search by first returning results that seem to be a better answer to the query. "Better" may mean that the words in the query occur more frequently, are closer together, or match some other criterion that the system classifies as superior.

NLP systems attempt to treat a natural language query as a complete question and use the words, sentence structure, etc., to locate and retrieve suitable documents. However, the different levels of meaning in natural languages discussed previously make NLP systems extremely difficult to design and implement.

Current IR systems, which are generally a combination of the three systems described above, have yet to successfully overcome many of the obstacles presented by natural language queries. For example, natural language information retrieval should deal not only with synonyms in a single language, but also across regions and countries. For example, a "truck" in the United States is often a "lorry" elsewhere. An additional problem is posed by words having multiple meanings, which often require interpretation through context. For instance, the word "charge" may refer to a military charge, an electrical charge, a credit card debit, or many other actions, each one of which should be known to the IR system.

The inability to specify important but vague concepts presents a further problem to IR systems. For example, formulating a question to identify the likelihood of political instability in a country necessarily involves abstract ideas. False drops are yet another problem in current IR systems. False drops are documents which match the query but are actually irrelevant. An example of this is a simple query for "Japan AND currency," which is intended to find articles on the topic of Japan's currency. However, a document which discusses Japan's housing problems in the first paragraph and the current currency situation in Canada in the third paragraph may be returned because it contains the requested terms.

Indexing inconsistencies also present problems for IR systems. Unless documents are indexed using the same consistent standards, document categories and organization tend to become blurred. A further difficulty to be overcome by IR systems is presented by spelling variations and errors. As with synonyms, spelling variations often occur when dealing with an international audience. Common variations such as "grey"/"gray" or "theater"/"theatre" should be identified by an IR system. In addition, misspellings might cause an IR system to miss a highly relevant document because it fails to recognize misspelled words.

Therefore, what is needed is an information extraction system that utilizes improved natural language processing techniques to process a user's natural language question, locate the information requested in the question, and return the information to the user.

SUMMARY

In response to these and other problems, an improved system and method are provided for extracting information using a pipe-lined finite-state architecture.

For example, in one implementation, a system and method are provided for processing a document containing multiple words to extract an answer. The method uses a set of signatures and signature based rules. Each rule includes a name formed by concatenating the signatures included in the rule and a concept which is assignable to the combination of signatures included in the rule. The method parses the words and assigns a signature to each of them. It may also assign a window which includes a parameter defining the number of signatures viewable at one time. The window may be moved so that the window reveals signatures not viewable in its previous position. The signatures viewable in the window are read and a rule name is created by concatenating the signatures. The created rule name is compared to the names of the rules and, if the created name matches any of the rule names, the matching rule is applied to create a concept and the concept is assigned back into the window.

DETAILED DESCRIPTION

The present invention provides a unique system and method for information extraction utilizing a pipe-lined finite-state architecture which provides an object oriented structure capable of processing natural language queries. It is understood that the following disclosure provides many different embodiments, or examples, for implementing different features. Specific examples of networks, components, and formats are described below to simplify the present disclosure. These are merely examples and are not intended to be limiting.

Figure 1:
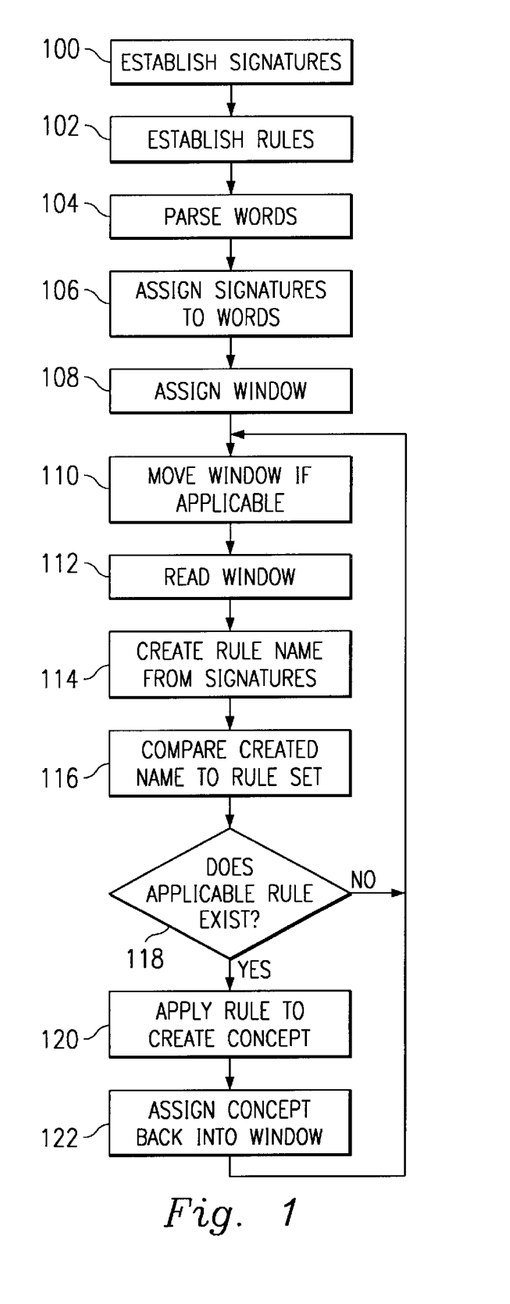
FIG. 1 is a flowchart of an exemplary process using a signature based approach to assign rules.

Referring now to FIG. 1, in one embodiment, the present invention provides a signature based approach enabling a rule set to be indexed for direct lookup during answer extraction. In steps 100 and 102, multiple signatures and signature based rules are established. The rule names reflect the signatures to which the rules apply. In step 104, words are parsed and, in step 106, the words are assigned signatures. In step 108, a window is assigned which determines the number of signatures which will be read in step 112. The window may be moved in step 110 before the signatures are read in step 112. The signatures are combined to create a name in step 114, and the created name is compared to the rule set in step 116. If an applicable rule exists, as determined in step 118, the rule is applied to create a concept and the concept is assigned back into the window in steps 120 and 122, respectively. Steps 110 through 122 may be repeated until either all the signatures have been processed or until some other defined event occurs.

The following description is divided into two main sections for purposes of clarity. The first section describes an exemplary pipe-lined finite-state architecture utilizing a signature based processing method. The second section describes the operation of an information extraction process based on the architecture of the first section. In addition, the second section also describes a method to combine multiple partial answers into a single answer.

Exemplary System and Architecture

Figure 2:
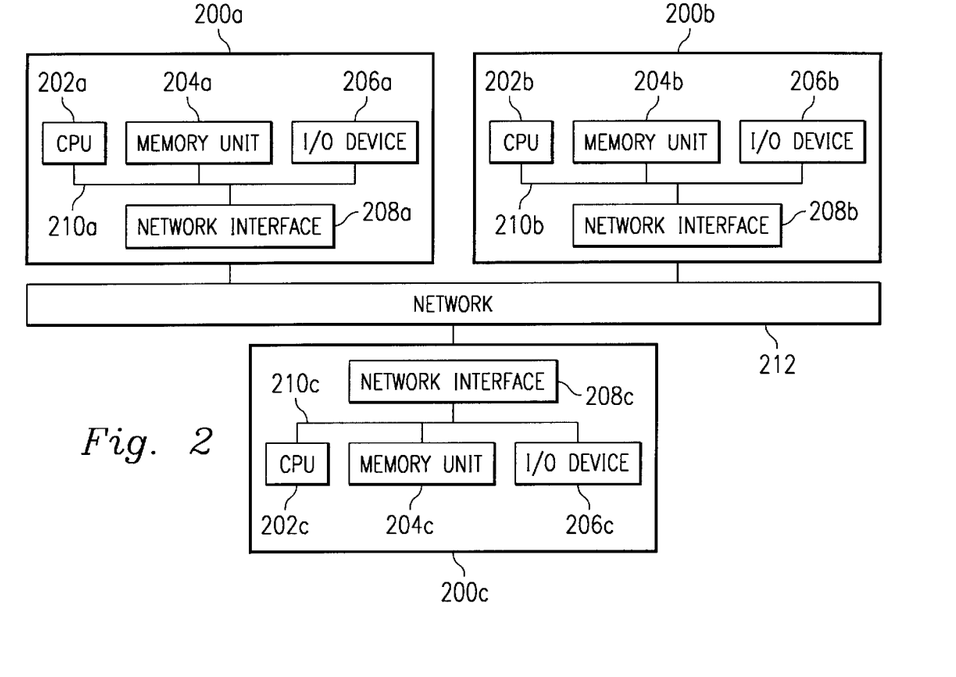
FIG. 2 is a schematic diagram of a network of computers that may be utilized for locating and retrieving documents according to the present invention.

Referring now to FIG. 2, three computers, designated 200a, 200b, and 200c, are illustrated as a representative example of an operating environment for the present invention. Each computer 200a, 200b, 200c includes a central processing unit ("CPU") 202a, 202b, 202c, a memory unit 204a, 204b, 204c, an input/output ("I/O") device 206a, 206b, 206c, and a network interface 208a, 208b, 208c, respectively. The components 202a, 204a, 206a, and 208a are interconnected by a bus system 210a, the components 202b, 204b, 206b, and 208b are interconnected by a bus system 210b, and the components 202c, 204c, 206c, and 208c are interconnected by a bus system 210c. It is understood that each of the listed components may actually represent several different components. For example, the CPU 202a may actually represent a multi-processor or a distributed processing system; the memory unit 204b may include different levels of cache memory, main memory, hard disks, and remote storage locations; and the I/O device 206c may include monitors, keyboards, and the like.

The computers 200a, 200b, 200c are also commonly connected to a network 212. The network 212 may be representative of several networks, such as a local area network, a company wide intranet, and/or the Internet. Because the computers 200a, 200b, 200c are connected to the network 212, certain components may, at times, be shared between the computers. Therefore, a wide range of flexibility is anticipated in the configurations of the computers. Furthermore, it is understood that, in many implementations, the computers 200a, 200b, and 200c may be configured differently from each other, may have different components, and/or one computer may act as a server to the other computer. For purposes of this example, the memory unit 204a includes multiple documents stored in various formats such as .txt, .pdf, .wpd, and .doc. Software for an IR search engine is included in the memory 204b. This software includes instructions for performing a search on the network 212 for documents matching a search string entered by the user or another application and returning the located documents. The memory 204c includes instructions for an IR processing architecture designed to formulate a query from a user's question using NLP techniques, pass the query to the search engine located in memory 204b, and extract the most relevant information from the documents returned by the search engine. Although the documents, search engine, and IR processing architecture are located in separate memories for purposes of example, they may be located in the same memory or in any combination of memories.

The present invention facilitates many different operational scenarios of the computers 200a, 200b, 200c and the network 212. Single server environments and multi-server environments, as well as distributed and non-distributed environments, may benefit from the present invention.

In operation, the architecture provides a signature based foundation for processing documents and performing information retrieval and extraction. The architecture assumes that a document contains information at different levels of specification and conceptual "firmness." The task of information extraction is to recognize the information that is explicitly stated at the lower-levels of representation (words, phrases, etc.) and from the combination of this information infer the presence of more structured, conceptual information that can more usefully be used to index the document. The architecture uses Finite State Transducers ("FSTs") to process and refine semiotic information structures extracted from text. The following description first offers an introduction to an exemplary pipe-lined finite-state architecture. It then describes object-oriented ("OO") design of information objects, OO design of FSTs, format preservation and exploitation, and finally an information extraction pipeline.

Introduction

Adopting a semiotic perspective, the following granularity of information is assumed:

Document( = File)Line ( = String) Token( = String) Word
Sign Concept Index

An Index object is a suitably specific concept on which the document can be indexed.

Of these granularities, the classes Word, Sign, Concept and Index are represented using dedicated object-oriented classes. Some classes, such as String, are already a basic class in languages like Java. These classes serve as the common currency of the information extraction architecture.

The architecture also assumes that the information is ontologically, or conceptually, grounded. In other words, the meaning of words and phrases is defined relative to an ontology or network of domain-specific concepts. An architecture without such an ontology is essentially syntactic, rather than semantic, and reduces to a keyword-based mechanism in which meaning is not an obvious ingredient.

This ontology can be represented as a hierarchically structured and cross-linked collection of "frames." Frames are a "soft" representation of concepts as objects, where "soft" denotes the ability of a program to modify the internal structure and external hierarchical position of frames at run-time. In contrast, "hard" objects, such as those used in Java and C++, are definable only at compile-time. Frames are named objects which contain one more or more named slots, which in turn can contain zero or more references to other frames via their names. Cross-linking of frames via slots in this manner creates a "concept network" whose meaning lies not so much in the frame names themselves, as in the connected patterns between names.

Though a frame can name its slots in any way it wishes, a variety of default processes are defined over slots with specific names. For instance, "inheritance" is a process defined over the slot named "isa" that allows slots to be carried down from superconcepts to subconcepts, where the superconcept is listed in the "isa" slot of the subconcept.

A semiotic basis for the representation of information is adopted, which means that an explicit structure is given to the semiotic notion of a "sign." In semiotics, a sign is a dual representation that brings together a coding of a signifier (e.g., word) that denotes some object or idea in the world, and a coding of that thing which is signified (i.e., a concept). A sign represents a bridge between words and concepts, and is thus the ideal level of information at which to describe the various processes responsible for running through a document and extracting useful indices. In effect, a sign ties the orthographic form of the signifier/word to the conceptual form of the signified concept, giving a complete picture of an information unit. For instance, the sign <"Box"/BOX> notes that the concept BOX is signified in this concept by a capitalized word. In context, the capitalization may be more important than BOX itself, suggesting to a name extraction process that "Box" is part of a larger name phrase such as "ABC for a Box, Inc.". To the semiotic notions of signifier and signified are added an information signature.

Referring again to FIG. 1, which is described now in greater detail, a set of signatures is established in step 100. A signature is a reduced representation that captures important generalizations at a particular level of representation. Every word may be assigned a signature. In some cases, the signature may be assigned directly by a lexicon, for a small set of useful words that aids in recognizing special types of named entities in text. Information signatures may be orthographic signatures, which represent words, or conceptual signatures, which represent concepts.

Conceptual signatures refer to the category to which the concept belongs and not to the naming convention used. For instance, the conceptual signature of MICROSOFT, IBM and SUN-INC is COMPANY in each case.

The lexicon may link certain known words to their conceptual equivalent.

Therefore, the signature of the words "inc," "company," "corp," "corporation," and "plc" is COMPANY. The signature of the words "mister," "mr," "ms," "mrs," "dr," "senator," "sen," "captain," "capt," "judge," "doctor," "professor," and other similar words is TITLE. A conceptual signature is a superclass of a concept that has notable generalization properties from the perspective of concept combination. In other words, it is more useful to know that MICROSOFT is a COMPANY than to know it is a WASHINGTON-COMPANY, at least as far as combination goes. Therefore, the set of conceptual signatures is a useful subset of the set of concepts in the information ontology as a whole.

If the lexicon does not assign a signature directly, one is given to the word based on its orthographic form (i.e., how it is spelled, the use of capitalization, digits, punctuation, etc.). An orthographic signature captures the alphabetic choices made in a word form, reflecting the word's use of capital and lower case letters, numeric digits and punctuation. Because the signature is a reduced form, many words with the same alphanumeric qualities will possess the same orthographic signature, allowing rules to generalize over entire word classes. For instance, each of the words in "International Computing Parts" may have the orthographic signature "ul," signifying an uppercase letter followed by one or more lowercase letters but no digits, which would be symbolized by a "d." Further examples may include the signatures "ul" for "Microsoft," "ulul" for "VeriSign," "1.1.1" for "www.microsoft.com," "$d" for "$5000," and "d.dl" for "74.5 m."

In step 102, the information signatures are utilized in designing and establishing generic combination rules or schemas that collate the basic information present in a text into larger, more cohesive and, thus, more indexable, information structures. Information signatures gain utility when they are combined according to pre-established rules to produce complex terms or phrases. For example, there may be a rule that says that a title followed by an uppercase alphabetic word should be read as a person's name.

An informal representation of such a rule might be expressed as:

TITLE+ul=PERSON (as in Mr Smith)
TITLE+ulul=PERSON (as in Dr McGill)

A rule may perform different functions, such as: (i) recognize when adjacent words (or phrases produced by other rules) should be combined to form a new concept phrase; (ii) assign a conceptual position to the new phrase in the concept ontology (e.g., the rules above assign the phrases to the concept family PERSON); iii) assign a signature to the new phrase, so that it may be recognized as the product of a specific rule by other rules.

For example, the rules above assign the two-element phrase to the class PERSON. For the sake of example, assume that the rules also label the phrase with the signature TITLE_NAME. This results in the following two rules:

TITLE_NAME+ul=PERSON (as in Mr John Smith)
TITLE_NAME+ulul=PERSON (as in Dr Bob McGill)

These rules are applied after the first rules. Therefore, when "Mr John" is recognized as a PERSON and labeled TITLE_NAME, the architecture sees that it is followed by "Smith", which has a signature "ul." The architecture then notes that it has a rule that will combine these two elements into a new phrasal element.

Therefore, using the concept of signatures, the architecture may be designed to represent and index rules for rapid recognition during information extraction. A rule combines two adjacent word elements into a new phrasal element. The first (leftmost) element may itself by the product of another rule, but the second (rightmost) may not, since rules are applied in a left-to-right manner as text is scanned.

A rule may be represented as a frame, whose name is a concatenation of the signatures recognized by the rule. Continuing the previous example, the above rules may be represented as follows:

Informal rule: TITLE + ul = PERSON (as in Mr Smith)

Representation: TITLE_+_ul concept: PERSON signature: TITLE_NAME

Informal rule: TITLE + ulul = PERSON (as in Dr McGill)

Representation: TITLE_+_ulul concept: PERSON signature: TITLE_NAME

Informal rule: TITLE_NAME + ul = PERSON (as in Mr John Smith)

Representation: TITLE_NAME_+_ul concept: PERSON

Informal rule: TITLE_NAME + ulul = PERSON (as in Dr Bob McGill)

Representation: TITLE_NAME_+_ulul concept: PERSON

The "_+_" is used to concatenate the signatures of the rule arguments to create a unique name for the rule.

To further explain the use of signatures and rules, assume the following sample text is being processed: "Mr. Bob Gates, president and CEO of Macrosoft Corporation, announced today that its flagship product, MulchMaker 2000, will be marketed by GardenStore.com of St. Augustine, Calif."

In step 104, the architecture uses a SignTokenizer (described later in more detail) to parse this text from left to right to identify each word and, in step 106, assign each word a signature as follows:

TITLE. ul ul, 1 1 ul ul COMPANY,1 1 1 1 1 1, ulul d, 1 1 1 1 ulul.1 1

PLACE_MARKER ul, STATE

The architecture may include punctuation, ignore punctuation, or ignore punctuation except in special circumstances. For purposes of simplification, the architecture in the present example ignores all punctuation.

The architecture may assign a "window" to the SignTokenizer as illustrated in step 108, although the window may be assigned in a different order than shown here. The window regulates the number of signatures, words, or other defined word elements visible to the SignTokenizer through the window and therefore may be used to regulate the application of rules. The window in this illustration is limited to signatures. If applicable, the window may be "moved" a predetermined number of signatures in step 110 to view the next window of words or signatures. Reading the sample text from left to right in step 112 using a two word window, the architecture sees "TITLE ul". It knows that if a rule were to apply to these signatures, it would have to be called TITLE_+_ul, so it creates this rule name from the two signatures in the window in step 114. The created name is then compared to the rule set to see if such a rule name exists in step 116. This comparison may be accomplished, for example, by doing a direct lookup in a hashtable. If an applicable rule exists, as determined in step 118, the rule is applied to create a new concept in step 120, and the signature assigned by the rule (if any) is substituted back into the SignTokenizer's window in step 122 to create:

TITLE_NAME ul, 1 1 u 1 ul COMPANY, 1 1 1 1 1 1, ulul d, 1 1 1 1 ulul.1 1
PLACE_MARKER ul, STATE Now the SignTokenizer sees "TITLE_NAME ul" in its window, and checks for a rule called TITLE_NAME_+_ ul. As previously described, the rule exists and is applied to produce the new phrasal concept "Mr. Bob Gates."

Continuing, the SignTokenizer later sees "ul COMPANY" in its window, and again checks for an applicable rule. The rule ul_+_COMPANY applies and is used to recognize Macrosoft Corporation as an instance of the concept class COMPANY. Similarly, the SignTokenizer may apply a rule ulul_+_d to MulchMaker 2000, which recognizes Mulch-Maker 2000 as a product name. A rule ulul.1 may be used to recognizes GardenStore.com as an e-Company. Two additional rules, PLACE_MARKER_+_ul (which recognizes a CITY_NAME) and CITY_NAME_+_STATE, may be applied to recognize "St. Augustine, Calif." as a city/state combination.

The information that is explicit in the textual form of a document is raw and ambiguous. This information becomes suitable for indexing the document once it has been refined by various semantic processes that apply the knowledge in the ontology which is, essentially, an encyclopedic description of what can interestingly be said in the documents. The most semantically-rich operation the system can apply to refine this information is "combination."

As illustrated above, the indices that a system chooses to classify a document are more than single words that occur in the text, rather they are ideas that span large areas of the text. In a sense, the set of conceptual indices extracted from the text serve as a "gist" for the text's meaning. This broad gist is extracted by combining more local elements of meaning that are evident at the word and phrase level of the text. Fundamental then to an information extraction system are mechanisms of sign combination, which focus on how to derive phrasal meanings from word-level meanings, and concept combination, which deals with how to derive thematic, gist-like meanings from the individual conception of event types and the entities that can partake in them.

In traditional linguistic systems, this combination mechanism is a grammar, while in traditional AI systems, this mechanism is an inferencer or theorem-prover. In these systems then, combination is a bottleneck because all other processes rely on it and its inherent complexity makes it slow and cumbersome. This is especially true as the grammar and/or axiom set grows; using a grammar is just like proving a theorem about sentence structure.

The architecture described here employs "combination" as a core notion.

Combination at various levels of information, whether linguistic signs or concepts, can be achieved in terms of simple string concatenation.

The architecture assumes a process model composed of cascaded FSTs. An FST is an abstract machine that accepts discrete input as tokens from one data stream and generates discrete output to another data stream. The machine may swallow tokens from the input stream, causing it to output less tokens than it inputs (i.e., it filters the input). Likewise, the machine may generate more tokens than it inputs (i.e., it augments the input), thus explicitly tagging the data stream with information that may otherwise have been left implicit. Many FSTs will transform their input into a more refined form of information object, for example, by transforming strings into words, words into signs, signs into concepts, or concepts into indices.

In contrast, some FSTs will aggregate successive input objects into new objects of the same type, for example, by aggregating simple sign objects into a new complex sign representing a multiword phrase. Interestingly, some FSTs may seem to an outside process to be doing no work whatsoever, simply copying information objects from their input streams directly to their outputs. In most cases, such "lazy" FSTs will in fact be "watchers" that collate hidden data structures from the pattern of objects that flow through them. For instance, a very useful watcher FST is a concordance FST, which maintains statistical tables charting the likelihood of particular signs occurring in contiguous input positions. These concordances are the basic grist of many probabilistic heuristics and learning strategies.

FSTs may be cascaded so that the output stream of one transducer serves as the input stream of another. In such cases, it is assumed that the output of a machine is more informative than its input, so that as data flows from machine to machine, it is further processed and refined until the final output is the finished information "product," which is the appropriate conceptual indices for the document. Therefore, the initial input to the cascade is a document which is a collection of characters, and the final output is a collection of Index objects. The FSTs between the initial input and the final output take care of this refinement of characters into indices via the information classes Word, Sign and Concept.

The cascaded FST model is that used in the FASTUS system, as described in Hobbs, et al., "FASTUS: A cascaded finite-state transducer for extracting information from natural-language text," *Finite State Devices for Natural Language Processing*, MIT Press, Cambridge, Mass. (1996). The FASTUS system has proved itself an efficient and maintainable architecture for information extraction. It is inherently object-oriented, since each FST can be represented with a generic class interface, and this interface allows new FSTs to be inserted into existing cascades at any point in the assembly line. The complex functionality of the whole is derived from the simpler functionality of the many. In effect, FST objects are like Lego bricks, which can be combined in many well-defined ways to create easily tailorable and scalable information-processing systems.

Object-Oriented Design of Information Objects

In OO terms, the information objects Word, Sign, Concept and Index can be described as follows:

Word (OO-structure)
  Isa:
    InformationObject
  Data:
    Root (String)
    Affix (String)
    Signature (String)
    Format (String)
  Methods:
    self(); // return Root
    signature(); // return Signature
  Constructor:
    Word (String phon);
Concept (OO-structure)
  Isa:
    InformationObject
  Data:
    Symbol (String)
    Signature (String)
    Ontology (Frame)
  Methods:
    self(); // return Symbol
    signature(); // return Signature

```
    denotation(); // return Ontology reference
    compound (NextCon) // if Concept and NextCon can be compounded,
            update Concept to absorb NextCon.
Constructor:
    Concept(Word signifier);
Sign (OO-structure)
    Isa:
        Information Object
    Data:
        Signifier (Word)
        Signified (Concept)
    Methods:
        self(); // return Signified.self(),
        signature(); // return Signified.signature();
        signifier(); // return Signifier,
        signified(); // return Signified,
        compound (NextSign) // if Sign and NextSign can be compounded,
                update Sign to absorb NextSign.
    Constructor:
        Sign (Word signifier, Concept signified);
Index (OO-structure)
    Isa:
        Concept
    Data:
        Symbol (String) // inherited from Concept
        Signature (String) // inherited from Concept
        Ontology (Frame) // inherited from Concept
        Associates (List) // inherited from Concept
    Methods:
        self(); // return Symbol;
        signature(); // return Signature;
        associates(); // return Associates;
        isAssociatedWith(Concept Filler); // return member(Filler,
                    // Associates);
        canAssociateWith(Concept Filler); // return TRUE if Thematic can
                    // accommodate Filler
        associate With(Concept Filler), // put Filler into Thematic, onto
                    // Associates;
    Constructor:
        Index (Sign Basis);
```

Object-Oriented Design of Finite-State-Transducers (FSTs)

In a similar vein, the OO structure of the class of generic FSTs can be designed as follows:

```
EST (OO-structure)
    Data:
        Input (FST) // The FST whose output feeds this FST
    Methods:
        next(); // Output the next information object from FST
                // Works by evaluating Input.next(), and
                // further processing the result
    Constructor:
        FST(FST inputTape); // A new FST is defined by establishing
                // the source of its input tokens
```

The following classes of FST are useful in an information-extraction context: File Tokenizer (Input=Document File; Output=Line Strings)

Segments a file into a stream of lines, either delimited by newline characters, or by punctuation conventions (e.g., use of periods).

String Tokenizer (Input=File Tokenizer; Output= Word Strings)

Segments a line string into a sequence of strings that correspond to whitespace-delimited subsequences (i.e., words and numbers) of a sentence.

Word Tokenizer (Input=String Tokenizer; Output= Word Objects)

Inputs a sequence of string tokens and outputs a sequence of corresponding Word objects. Each Word object contains the root (stem) and affixes (e.g., "ed", "ming") of an input string token, as well as an "orthographic signature string" that encodes the character conventions used (e.g., were capital letters, lowercase letters or numbers used, and in what order?).

Sign Tokenizer (Input=Word Tokenizer; Output= Sign Objects)

Inputs a sequence of Word objects and outputs a sequence of corresponding Sign objects. Each sign object connects the Word used in the text to the Concept object denoted by the word, where each Concept object contains a reference to an appropriate Frame in the concept ontology.

Sign Compounder (Input=Sign Tokenizer; Output= Sign Objects)

Inputs a sequence of Sign objects and outputs a sequence of Sign objects. Each output Sign object corresponds to one of more contiguous input Sign objects. When successive input Sign objects can be concatenated to create a valid compound Sign object, only the newly compounded Sign is send to the output. Two sign objects can be concatenated under certain conditions: if the concatenation of their word forms denotes a existing concept in the ontology (e.g., "Hewlett" +"Packard" =HEWLETT-PACKARD-INC); if the concatenation of their signature forms denotes a class of existing concepts in the hierarchy (e.g., two capitalized words in succession probably denote a named entity; a named entity followed by "inc" or "co" denotes the conceptual class COMPANY).

Multiple sign compounders may be directly cascaded to capture a examples that arise from "right recursion." This occurs when three or more successive signs should be compounded as (A (B C)) rather than ((A B) C).

Sign Filter (Input=Sign Tokenizer; Output=Sign Objects)

Inputs a sequence of Sign objects and outputs a sequence of Sign objects from which unnecessary function words and other high-frequency, low discrimination terms have been removed.

Sign Concordancer (Input=Sign Tokenizer; Output= Sign Objects)

Inputs a sequence of Sign objects and outputs the same sequence of Sign objects. As Signs pass through this FST bigram statistics are maintained, recording: the probability that given one sign, another will immediately follow; the probability that given one sign, another with a particular "conceptual signature" will follow (e.g., PERSON follows "Mr"); the probability that given a sign, it will be immediately preceded by a sign with a particular conceptual signature (e.g., COMPANY precedes "corp"). These statistics can be used to identify new lexical contexts for recognizing new concept instances such as product names, company names, person names, etc.

Concept Tokenizer (Input=Sign Tokenizer; Output= Concept Objects)

Inputs a sequence of Sign objects and outputs a sequence of Concept objects denoted by the input Signs. This is a simple FST that strips away unwanted object complexity once that complexity has served its purpose (e.g., in Sign compounding and concordance).

Concept Compounder (Input=Concept Tokenizer; Output=Concept Objects)

Inputs a sequence of Concept objects and outputs a sequence of possibly fewer, but more complex, Concept objects. The Frame:slot structure underlying a concept will dictate how that concept can combine with its immediate neighbors in a concept stream. So if two successive input concepts can be compounded to make a more complex concept, that complex concept is sent to the output stream in place of one, or both, of the input concepts (e.g., MICROSOFT+PRODUCT MICROSOFT-PRODUCT).

Concept Associator (Input=Concept Tokenizer; Output=Concept Objects)

Inputs a sequence of Concept objects and outputs a sequence of possibly fewer, but more complex, Concept objects. Like a ConceptCompounder, the Frame:slot structure of concepts is used to determine if and how two concepts can combine. But unlike a ConceptCompounder, combination is not restricted to contiguous concepts in the input, but to concepts which appear in the same sliding window of N input concepts. Input concepts which enter a concept associator pass through a window of N positions, whereby any two concepts that appear in the same window are viable candidates for combination. When N=1, a concept associator reduces to a ConceptCompounder.

Concept Indexer (Input=Concept Tokenizer; Output=Index Objects)

Inputs a sequence of Concept objects and outputs a sequence of Index objects. Index objects are specializations of Concept objects whose structure makes them inherently more appropriate for indexing a document that raw concepts pe se. In essence, Index objects are that subset of concept objects that serve as interesting or noteworthy indices because: they are very specific (e.g., denoting a particular company like MICROSOFT rather than the generic class COMPANY); they are instantiated (e.g., a MERGER instance where the specific companies are known); or they are rare enough or dramatic enough to be indexable (e.g., the classes EARTHQUAKE, MARKET-CRASH, SCANDAL, etc.). In effect, the ConceptIndexer transducer is a filter that promotes "interesting" concept objects to index objects, and filters the rest.

Format Preservation and Exploitation

The following classes of objects allow formatting context to be preserved for signs, and thus exploited in the chunking of signs into complex patterns.

InformationFormatObject

An object of this type maintains the formatting state in which a word/sign is encountered. Encapsulated state variables store whether the word is italicized, bold, emphasized, centered, found in a title, found in a heading, found in a table cell, etc.

These state variables are settable via public methods such as startitalic and enditalic. A formatting object describes the state when a word is found. This state can then be packaged and stored in the word object created for the word. This is done by adding a Format field to the Word class. This field contains the signature of the InformationFormatObject at the time the word was tokenized.

```
OO-structure
    Isa:
        InformationObject
    Data:
        Italics (boolean)
        Bold (boolean)
        Centered (boolean)
        Emphasised (boolean)
        Titular (boolean)
        HeadingLevel (int)
    Methods:
        signature(); // returns String that captures contents of state above
    Constructor:
        InformationFormatObject(); // returns blank formatting state
        InformationFormatObject (String signature);
                    // returns formatting object whose state is
                    // described by signature string
```

InformationFieldObject

An object of this class contains the phrasal context (a String) of the formatted field in which a sign occurs. Signs which occur in the same field will thus point to the same InformationFieldObject, and be able to access the same contextual information.

Signs are determined to belong to the same field by using formatting information stored in a FieldFormatter object. When a new sign is passed to an InformationFieldObject instance, it is added to the field if it possesses the same formatting information (italics, etc.) as the field. If it possesses different formatting info, then the sign is determined to belong to a new field, and so a new InformationFieldObject is instantiated and that instance is returned.

In this sense, InformationFieldObject is a factory class, one that produces successive instances of itself as they are needed. Only the first instance (for a given document) need be explicitly constructed.

```
OO-structure
    Isa:
        InformationObject
    Data:
        FieldFormatter (InformationFormatObject)
        FieldFormat (String)
        FieldWordForm (String)
        FieldConceptForm (String)
    Methods:
        add Word (String word) // adds word to end of FieldWordEorm
        addConcept(Concept con) // adds con to end of FieldConceptForm
        addSign (Sign s)
            returns InformationFieldObject
                    // calls add Word and addConcept with fields of s
                    // and returns either this object or a new object
    Constructor:
        InformationFieldObject(InformationFormatObject format);
            returns a new InformationFieldObject
            with FieldFormatter = format
            and FieldFormat = format.signature();
```

HTML Tokenizer (Input=String Tokenizer; Output= Word Objects)

Creates and maintains an instance InformationFormatObject. Inputs a sequence of string tokens and outputs a sequence of corresponding Word objects. Input tokens corresponding to html markup elements are used to update the state of an InformationFormatObject, and are not passed into the output. Word objects that are created from non-html markup tokens have their Format field set to the signature of the InformationFormatObject at the time of their recognition.

Field Formatter (Input=Sign Tokenizer; Output= Sign Objects)

Inputs a sequence of sign objects and outputs the same sequence of sign objects, appropriately tagged with an InformationField object. An InformationField object is placed in each sign as it passes through this FST. If the Format of the sign is the same as the previous sign to pass through, the previously issued InformationField object is used; otherwise a new one is created. In this way signs can be recognized as belonging to the same information field, by virtue of pointing to the same InformationField instance.

Signs that point to different InformationField instances belong to different information fields. The FieldWordForm and FieldConceptForm members of each InformationField instance are updated whenever a sign is made to point to it; the update concatenates the word form of the new sign to the end of FieldWordForm member, while concatenating the concept form of the new sign to the end of the FieldConceptForm member. Each sign thus has access to the "phrasal context" and "conceptual context" in which it is used.

The Information Extraction Pipeline

As a basic configuration, FSTs are organized in the order described so as to refine the raw textual data of the input files that enter one end of the assembly line into the rich conceptual objects that arrive at the far end. In between, this information accrues in specificity as it progresses via the Word, Sign, Concept and Index stages through successive processes of tokenization and combination.

The following high-level processes are achieved by lower-level interactions that occur along this FST pipeline.

Event collation is a process where a conceptual picture of a given event as described in a document emerges from individual concepts present throughout the text. For example, the event in which company ABC123 (potentially) merges with company XYZ789 is a complex concept constructed from the individual concepts ABC123, XYZ789, and Merger that are present in the text.

Ontological extension is a process whereby the system's ontology extends itself in reaction to the documents it analyses. In this way, the ontology "bootstraps itself," by first using the existing contents of the ontology to recognize new concepts in text (e.g., that "Cache Flow Inc." is a company), and by then using statistical generalizations over the data it sees to infer new recognition patterns. Both of these processes are simple forms of unsupervised learning, since no human interaction is necessary to guide the recognition of new instance concepts and recognition rules after the initial ontology is constructed.

Unsupervised learning is restricted to learning simple generalizations, such as "corp" always following a company name. To learn the patterns of signs that underlie complex events (like company takeovers or management successions), supervised learning is typically necessary. This supervision occurs in the form of a hand-tagged training corpus, in which the precise classification of sign patterns the system is to learn have already been marked by a human. Since the system can now recognize positive instances of the patterns it needs to learn from this corpus, it can use machine learning algorithms to generate a "cover-set" of schemas that cover the positive examples and exclude the negative examples.

Exemplary System and Process

Figure 3:
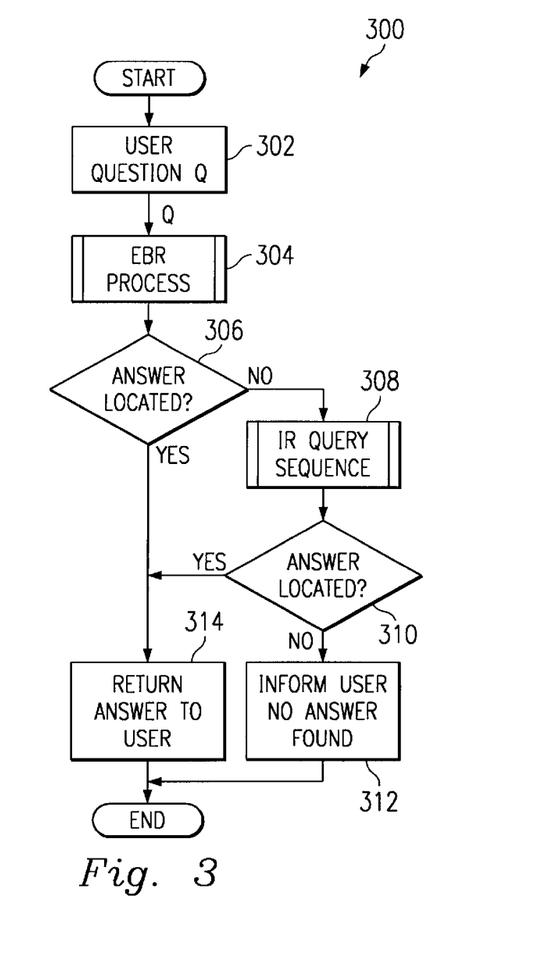
FIG. 3 is a flow chart illustrating information retrieval processes that may be implemented in the network of FIG. 2.

Referring now to FIG. 3, an IR process 300 based on the pipe-lined finite state architecture of the previous section provides information query, retrieval, and extraction services operable on one or more networked computers, such as the computers 200a, 200b, and 200c of FIG. 2.

The IR process 300 uses the scanning, rule application, and signature assignment described in reference to the preceding architecture. The IR process 300 begins when a user initiates a query with a natural language question Q in step 302. For purposes of example, the user wants to find the name of the current Chief Executive Officer ("CEO") of ABC123 Corporation. To begin the search, the user asks the natural language question, "Who is the CEO of ABC123?." The correct answer, which the IR process 300 is to return to the user, is John Doe.

The signature based rule system is applied to the user's original question and the phrase structures recognized as the rule are applied are translated into specific query structures. For instance, if the rule process recognizes "Mulchsoft Corporation" as a named entity in the question, the query fragment #od2(Mulchsoft Corporation) is generated. The term "#od2" constrains the query to consider only texts in which Mulchsoft occurs before Corporation, with at most one intervening word between the two. Therefore, the rule process may be used to impose phrasal structure on the question, and this phrasal structure is used to add constraints to the query that is produced. The rule process is ultimately responsible for generating the query, but it may not run on the query.

In step 304, the IR process 300 attempts to answer the question using a set of exemplar questions already known to the system in an example-based-reasoning ("EBR") process. A more detailed description of the EBR process is described in further detail with respect to FIG. 4.

Figure 4:
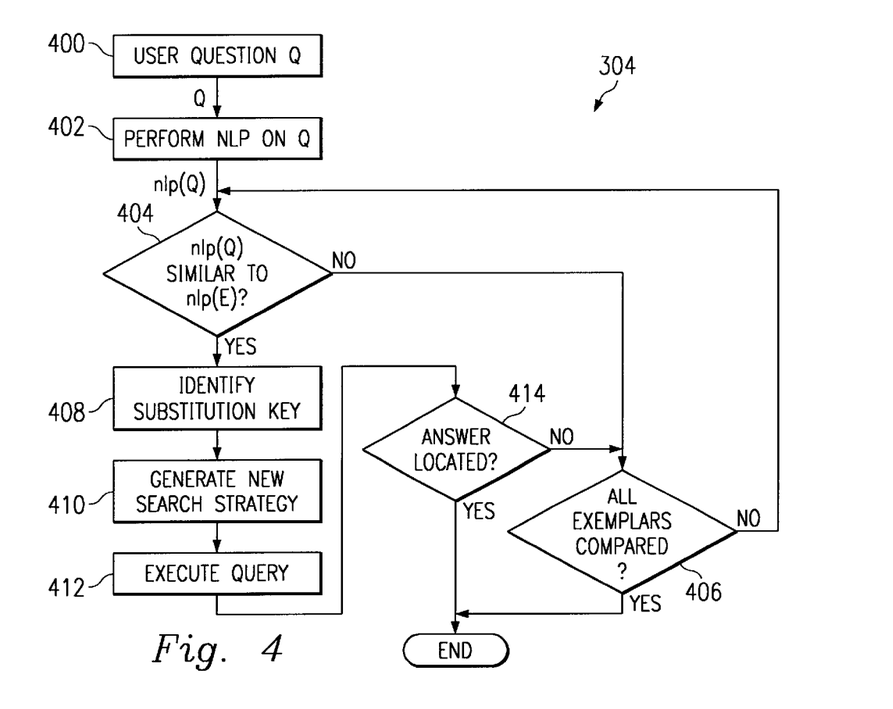
FIG. 4 is a flow chart illustrating an example-based-reasoning process.

Referring now to FIG. 4, the EBR process 304 of FIG. 3 attempts to match a question against a template for which the EBR process 304 is able to locate an answer. The EBR process 304 begins in step 400 by receiving a user's natural language question. Continuing the above example, the user's question is "Who is the CEO of ABC123?." In step 402, the EBR process 304 analyzes the user's question using NLP techniques to find the major phrase groupings in the question. The NLP techniques may utilize the signature based processing previously described, although other NLP techniques may be used in conjunction with, or as an alternative to, the signature based processing. In addition, the analysis identifies any semantic entities that the query may contain, such as the proper names of people, companies or places.

The NLP analysis at this stage is generally a shallow analysis which does not produce a rich representation of the question's meaning, but a heuristic representation of what is being sought (person, place, time, company names, etc.), what terms modify each other, and what terms can safely be ignored ("of," "with," etc.). For purposes of this example, the analysis will identify the two entities "CEO" and "ABC123," and result in a question nlp(Q) that is the result of the natural language analysis.

The processed question nlp(Q) is then compared in step 404 with an exemplar question of the form nlp(E). An exemplar is a predetermined question that demonstrates to the system how to find an answer to a particular request in a structured database. For example, an exemplar for the question, "Who is the CEO of NoName?," may be represented by an nlp(E) structured as "select CEO_NAME, COMPANY_NAME, CITY from DunAndBradstreetTable where" +"COMPANY_NAME like 'NoName%'". Associated with the exemplar is a specific strategy for finding the answer to that particular exemplar. For example, the exemplar for the question "Who is the CEO of NoName?" may be associated with a strategy such as a database query like "select CEO_NAME, COMPANY_NAME, CITY from DunAndBradstreetTable where COMPANY_NAME like 'NoName%'". This informs the system to retrieve the name of the CEO for NoName from the Dun and Bradstreet database when given that particular query.

In step 404, the EBR process 304 determines whether the exemplar being compared with nlp(Q) is similar. If nlp(Q) and nlp(E) are not similar, the EBR process determines in step 406 whether other exemplars remain to be compared. If no other exemplars remain, the EBR process returns control to step 306 of FIG. 3. If other exemplars remain, the EBR process 304 returns to step 404 and compares nlp(Q) with the next nlp(E).

If the EBR process 304 finds an exemplar where nlp(E) is similar to nlp(Q), the EBR process 304 identifies a substitution key in step 408. The substitution key represents the dissimilarity between nlp(E) and nlp(Q). In this case, the difference between nlp(E) and nlp(Q) results in the key "NoName=ABC123". The exemplar is then modified by the EBR process 304 in step 410 by combining the strategy associated with nlp(E) with the substitution key ABC123 to generate a new strategy, "select CEO_NAME, COMPANY_NAME, CITY from DunAndBradstreetTable where" +"COMPANY_NAME like 'ABC123%'". The EBR process 304 then executes the strategy in step 412 by querying the database with the new query "select CEO_NAME, COMPANY_NAME, CITY from DunAndBradstreetTable where COMPANY_NAME like 'ABC123%'". If this query produces an answer as determined in step 414, the EBR process 304 is completed. If no answer is located, the process 304 continues trying to match nlp(Q) with other exemplars until it has either located an answer or failed to find a match with all possible exemplars. The EBR process 304 then returns to step 306 of FIG. 3.

Continuing now with FIG. 3, the IR process 300 determines whether an answer was returned by the EBR process in step 306. If an answer was returned by the EBR process, the answer is returned to the user in step 314. However, if no answer was located by the EBR process, the system utilizes an IR query sequence in step 308 to search for an answer. Because the initial exemplary question, "Who is the CEO of ABC123?," is of a type that may be readily answered by the EBR process 304, a new exemplary question, "How many people died in the Big Company disaster?," will be used to illustrate the operation of the IR query sequence. The IR query sequence is described in more detail in reference to FIG. 5.

Figure 5:
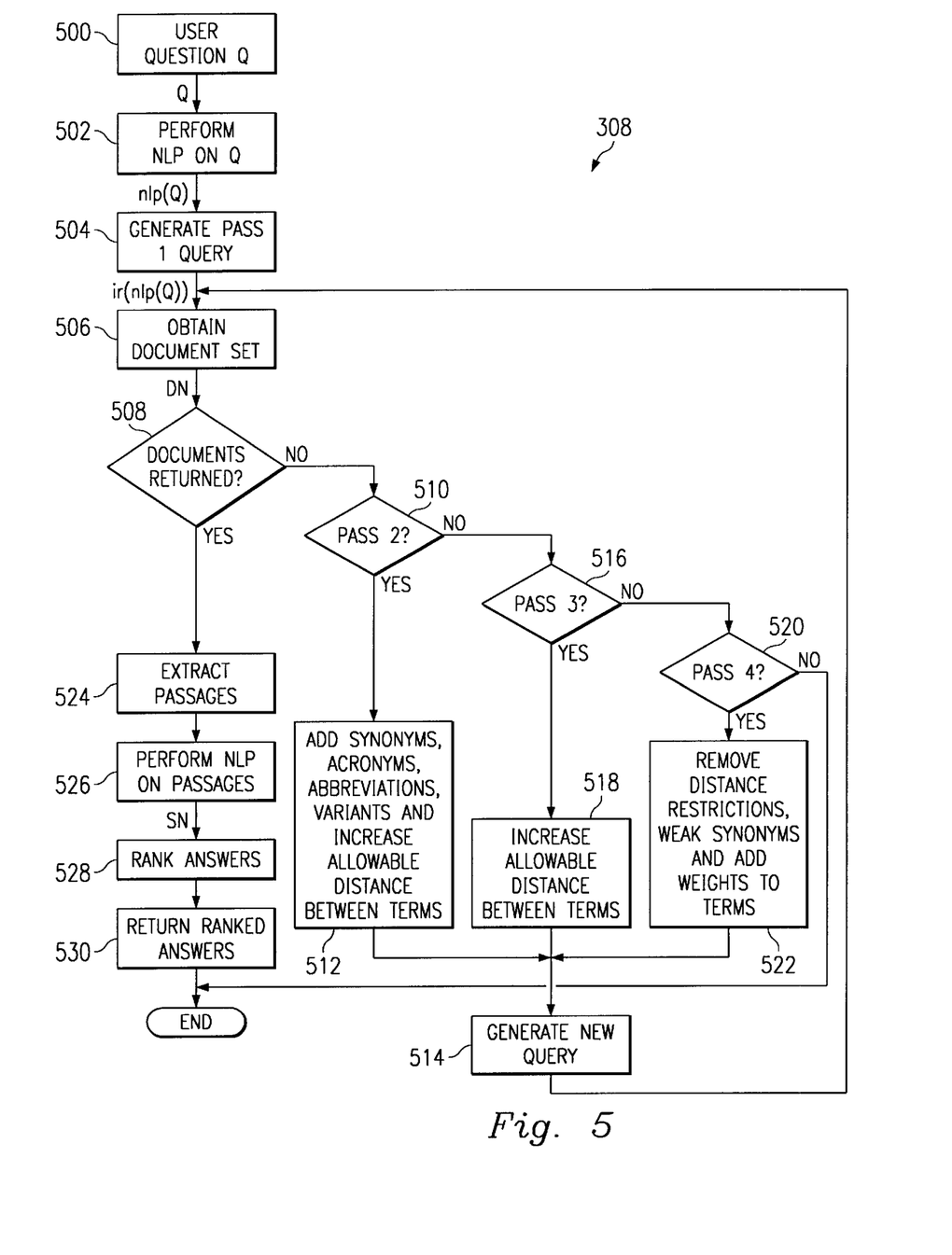
FIG. 5 is a flow chart illustrating an information retrieval sequence using natural language processing.

Referring now to FIG. 5, the IR query sequence 308 of FIG. 3 receives a user question Q which asks, "How many people died in the Big Company disaster?," in step 500 and initiates a retrieval process designed to locate an answer to the question. In step 502, the IR query sequence 308 performs natural language processing on the user question Q. This processing produces nlp(Q), which captures the following information. "Big Company" is a phrase and, based on its capitalization pattern, is a "named entity." The question Q is attempting to locate a numeric amount, as indicated by the term "how many." "People" and "died" are part of one syntactic frame, while "Big Company" and "disaster" are part of another syntactic frame.

The question nlp(Q) is used in step 504 to generate an initial IR query ir(nlp(Q)), which uses structured phrasal operators to mirror the syntactic and semantic arrangement of the original question. In the initial expression of the query, the IR query sequence 308 may use only those terms it considers focal to the question. This helps the IR query sequence 308 target the most relevant documents.

The initial query, called a "pass 1 query," is generated so that it mirrors the syntactic structure of the question insofar as words that comprise the same concept are constrained to occur in exact sequence, and words that modify each other are constrained to occur within a certain distance of each other. If the question contains phrasal terms, like "chief executive officer," those terms are recognized using a lexicon and transformed into a normalized form, such as "CEO." The lexicon contains information regarding the vocabulary of a language and may include morphemes associated with different words, word variations, abbreviations, etc. Therefore, a word may be associated with one or more equivalent lexical values. Irregular variants of the search terms are used to generate the query. For instance, if the question is "Who spun-off ABC123?," the resulting query may contain lexical knowledge in the form of a disjunction (#or) of the terms "spin-off" and "spun-off." Specific forms of vague words are also included as choice options. For instance, the term "person" can match "man" and "woman," and choices are also introduced for abbreviated and acronym forms. This pass 1 query is the most restrictive version because all of the search-terms, in one variant or another (e.g., "spin" or "spun"), should be present in a document in the specified distances and sequences for the query to be satisfied.

In this example, ir(nlp(Q)) has the form "#uw24(#uw12 (people die) #uw12(#od2(big company)disaster))." #uw24 is a query operator that indicates the elements following the operator should be found in an unordered window of twenty-four words or less. #od2 is a query operator that indicates that "Big" and "Company" should be found in strict sequence, with no more than a single intervening word. Therefore, the query ir(nlp(Q)) instructs a search engine to find documents in which the word "people" is found within 12 words of "die," "big" is followed by "company," and "people"&"die" are within 24 words of "big company"&"disaster".

The pass 1 query ir(nlp(Q)) is used in step 506 to retrieve a set of matching documents DN from a search engine. Typically only a small handful of documents (around fifteen) are retrieved. If no documents are retrieved, the pass 1 query is too narrow and needs to be broadened. The number of documents to be returned for a successful query may be varied, but for purposes of illustration, an successful query returns one or more documents. If one or more documents have been retrieved as determined in step 508, the IR query sequence 308 moves to step 524. If no documents were retrieved, the IR query sequence 308 continues to step 510, where it determines whether a pass 2 query has been executed. If a pass 2 query has not been executed, the sequence broadens the scope of the pass 1 query ir(nlp(Q)) in step 512.

In pass 2, the query is reformulated to allow greater word distance between related search terms like "people" and "die," but not between terms that should occur in strict sequence. The constraint regarding term sequence is seldom weakened, as it makes no semantic sense to do so. In addition, known synonyms for the search terms are found in the lexicon and injected into the query as alternative terms. Therefore, a pass 2 query might look for both "people" and "person," and be satisfied by documents that contain at least one of the two terms in addition to satisfying the rest of the query.

Therefore, broadening the pass 1 query results in the generation of a pass 2 query in step 514, where ir(nlp(Q)) is modified to become "#uw30 (#uw30 (#syn(people person) #syn(die fatal kill)) #uw30(#od2(big company) #syn (calamity catastrophe disaster))). The pass 2 query differs from the pass 1 query in two aspects. First, the maximum allowable distance between words and phrases has increased to thirty words. Second, synonyms for words present in the original question are included in the query. For example, the pass 2 query will accept documents containing "person" for "people," "fatal" or "kill" for "die," and "calamity" or "catastrophe" for "disaster." The IR query sequence 308 then returns to step 506, where it obtains a new set of documents $D_N$ using the pass 2 query ir(nlp(Q)).

If the pass 2 query fails to produce a document set $D_N$, step 508 directs the IR query sequence 308 to step 516, where a determination is made as to whether a pass 3 query has been executed. If pass 3 has already occurred, the sequence continues to step 520. If pass 3 has not been executed, a pass 3 query is formulated in step 518 by broadening the pass 2 query.

In the pass 3 query, the allowable distance between related words is increased. As with passes 1 and 2, all of the search-terms, in one variant or another (e.g., "people" or "person," "catastrophe" or "disaster"), should be present in a document in the specified distances and sequences for a query to match the document.

Therefore, pass 3 results in further broadening ir(nlp(Q)) to become "#uw40(#uw40 (#syn(people person) #syn(die fatal kill)) #uw40(#od2(big company) #syn(calamity catastrophe disaster))). The pass 3 query differs from the pass 2 query in that it increases the maximum allowable distances between words and phrases to forty words. After generating the pass 3 query ir(nlp(Q)) in step 514, the IR query sequence 308 again returns to step 506 and obtains a new set of documents DN.

As before, if the pass 3 query fails to obtain documents in step 508, the IR query sequence 308 determines if a pass 4 query has been executed in step 520. If pass 4 has already taken place, the IR query sequence 308 ends and control returns to step 310 of FIG. 3. If a pass 4 query has not yet been executed, a final query is formulated for a fourth pass in step 522 and generated in step 514. Since pass 4 is the last attempt by the system to retrieve relevant documents, the form of the query is broader than that of the first three queries.

In pass 4, only "strong" or highly relevant synonym knowledge is used. However, irregular word variants, such as "spin"/"spun" and "acquire"/"acquisition," are employed. Additionally, whereas passes 1 through 3 each requested that at least one variant of each search term was found in the document, within the prescribed distances and sequences, pass 4 allows partial retrievals. This allows pass 4 to favor documents that contain all of the search terms, but considers those that contain only some and, in rare cases, to accept documents that contain only one. A weighted sum operator is used to give each search term a "weight," which means that certain terms may be labeled as more important than others. For example, a proper name may be weighted more heavily than other search terms. Furthermore, the restrictions regarding the proximity of the terms are removed.

Therefore, in pass 4, ir(nlp(Q)) is further weakened to become "#wsum(110 #syn(people person) 10 die 1000 #od2 (big company) 10 disaster)." The pass 4 query dispenses with the unordered-window operator #uw, which was used to ensure that key phrases occurred in a defined proximity. The weighted-sum operator, #wsum, acts like an OR operator but allows more important parts of the OR statement to be weighted. For example, the term "big company" is given a weight of 1000, while "disaster" is given a weight of 10. This means that a document which contains one occurrence of "big company," but not "disaster," will be marked as more relevant than documents that only contain one occurrence of "disaster." The pass 4 query also drops some of the synonyms that were contained in the pass 3 and 4 queries. The IR query sequence 308 then returns to 506 for a final attempt to find a match, where it obtains a new set of documents DN using the pass 4 query ir(nlp(Q)).

This iterative, four pass approach allows lexical knowledge about word forms and synonyms to be used in a tiered fashion, with different elements of lexical knowledge utilized in each pass. For example, synonym information is excluded from pass 1 since an answer is generally more satisfactory if it is expressed in the same terms as the question. The use of synonyms can also make a query diffuse to the point that answers with exact word matches are not valued above answers that are mere paraphrases, particularly when a precise answer is not available and the system should return a piece of text that only tangentially answers the question. However, passes 2 and 3 freely use this information, both because they are structurally constrained and because the failure of pass 1 means the system should be more accommodating of near misses if it is to find a satisfactory answer. Pass 4 serves as a final attempt to find relevant documents by broadening the search to accept partial matches.

If any of the four passes are successful in returning a document set, the IR query sequence 308 continues to step 524. In step 524, the IR query sequence 308 uses the query ir(nlp(Q)) that retrieved the current document set DN and extracts the passages from the documents that best match the query. For example, a document that matches the fourth query "#wsum(110 #syn(people person) 10 die 1000 #od2 (big company) 10 disaster)," may only have two sentences out of two hundred in which Big Company and a disaster are mentioned. The user who initiated the query is interested in those passages, but not necessarily in the documents in which they are contained. Therefore, identifying the passages which match the query ir(nlp(Q)) allows the IR query sequence 308 to focus on the information which is of interest to the user.

Using the selected passages, the IR query sequence 308 then performs a natural language analysis of these passages in step 526 to determine which, if any, contain specific answers of the correct semantic type. This semantic analysis may use the same signature based techniques that were used to analyze the original question in step 502. Named entities and concepts such as company names, processor speeds, product prices, places, etc., which pertain to the type of the question are extracted. For example, a "who" question seeks a named entity for an answer, while a "how much" question seeks a quantity.

Different passages in the retrieved documents are then scored according to their semantic fit, which focuses on whether they contain an answer of the correct semantic type, and their IR relevance, which examines how well the specific passage matches the query. For example, for the query "Who is the CEO of ABC123?," the type is PERSON, so a semantic analyzer should be capable of recognizing person names in text. Likewise, the semantic analyzer should be able to recognize numbers to determine whether a passage might answer the question, "How many people died in the Big Company disaster?". This analysis results in a semantically analyzed set of answers $S_N$.

The IR query sequence 308 then moves to step 528, where the pertinent concepts in each passage in $S_N$ receive a cumulative score based on the score of the passage. If the same concept exists in several different answer passages, it will become more highly ranked than a concept that only occurs once because of the cumulative scoring described above. Thus, answers are ranked according to their popularity across different documents and according to the weight of historical evidence. This reduces the effects of noise and the chances that a meaningless answer can slip through.

For example, given a set of answers $S_N$, the set is converted into an ordered list by using an evaluation function to score the answers based on such features as answer locality, answer frequency, and answer conciseness. Answer locality focuses on how close the answer is to the key terms of the question. Answer frequency examines how often the answer appears. For example, how often the company's current name "Big Company," as opposed to the company's former name "Small Company," appears in the set of answers. Answer conciseness focuses on how short and to the point is the sentence in which the answer appears, since long answers are likely to contain misdirecting noise.

Finally, in step 530, the set of best answer passages $S_N$, ranked by score, are presented to the user. In addition, the best concepts, also ranked by score, are presented to the user. The latter provide a useful conceptual index of the documents that pertain to the question. The IR query sequence 308 then returns control to step 310 of FIG. 3. Referring again to FIG. 3, if an answer is obtained by the IR query sequence 308 as determined in step 310, the answer is returned to the user in step 314. If no answer is obtained, the IR process 300 informs the user that no answer was located in step 312.

In an alternative embodiment, a composite answer is produced by an IR query sequence to combine answer fragments into a single answer. The goal of the IR-based question-answering sequence discussed above is to construct a query that will retrieve a relevant document containing an answer, and to locate within that document a passage that satisfies two criteria: first, the passage should itself demonstrate obvious relevance by matching the query to a significant degree; and second, the passage should contain a specific concept of the desired type, such as a place, person, date, or company. This concept can be considered the specific answer, while the passage can be considered the answer context.

However, these two criteria are not always coincident in the same passage. The specific answer, such as a date, may be introduced at the top of a news document, while the answer context, which is a sentence that best matches the query, may be introduced later. For instance, consider the question "When was Tony Blair's child born?". A news story describing this event may open by establishing the scene as London, May 21, and then proceed to describe various events of the day. Midway through the story, it may be reported that Mr. Blair's wife gave birth to a son Leo, and mother and child are recuperating in a London hospital. A question-answering system that is to choose a single passage as an answer may be unable to do so. The former sentence contains the desired semantic type, but may seem utterly irrelevant to the user (e.g., the story may open with a place, date, and a brief description of a derailed train). The answer context is completely relevant, but lacks the particular answer being sought.

A solution to this problem is to construct a composite answer that incorporates both the specific answer and the broader answer context. Since the specific answer is a single phrase, like "Tony Blair," "May 21," or "London," it can be prepended onto the sentence or passage chosen as the answer context. Thus, the answer presented to the user might be: "[May 21] Cherie Blair, wife of prime minister Tony Blair, gave birth to a boy, Leo, today at St. Alban's Mercy hospital in London."

Composite answers solve another dilemma associated with the iterative, query-modifying approach to question-answering, such as that posed by the question "How did Harry Houdini die?". During pass 1, a number of documents may be retrieved, one of which describes how Mr. Houdini almost died while performing his water-torture cell escape. The system recognizes the relevance of the answer, but fails to recognize in it the appropriate semantic type (a cause), so the query is successively modified through passes 2, 3 and 4. Eventually an answer is found that mentions Harry Houdini in a context that semantically satisfies a "how" question, but it is not a genuine answer. The answer uses the term "Harry Houdini" metaphorically to refer to a clever escape by Tiger Woods from a sand trap on the seventh hole. Clearly, the former context is better than the latter, but the later context satisfies the system's need for a concise semantic answer.

Figure 6:
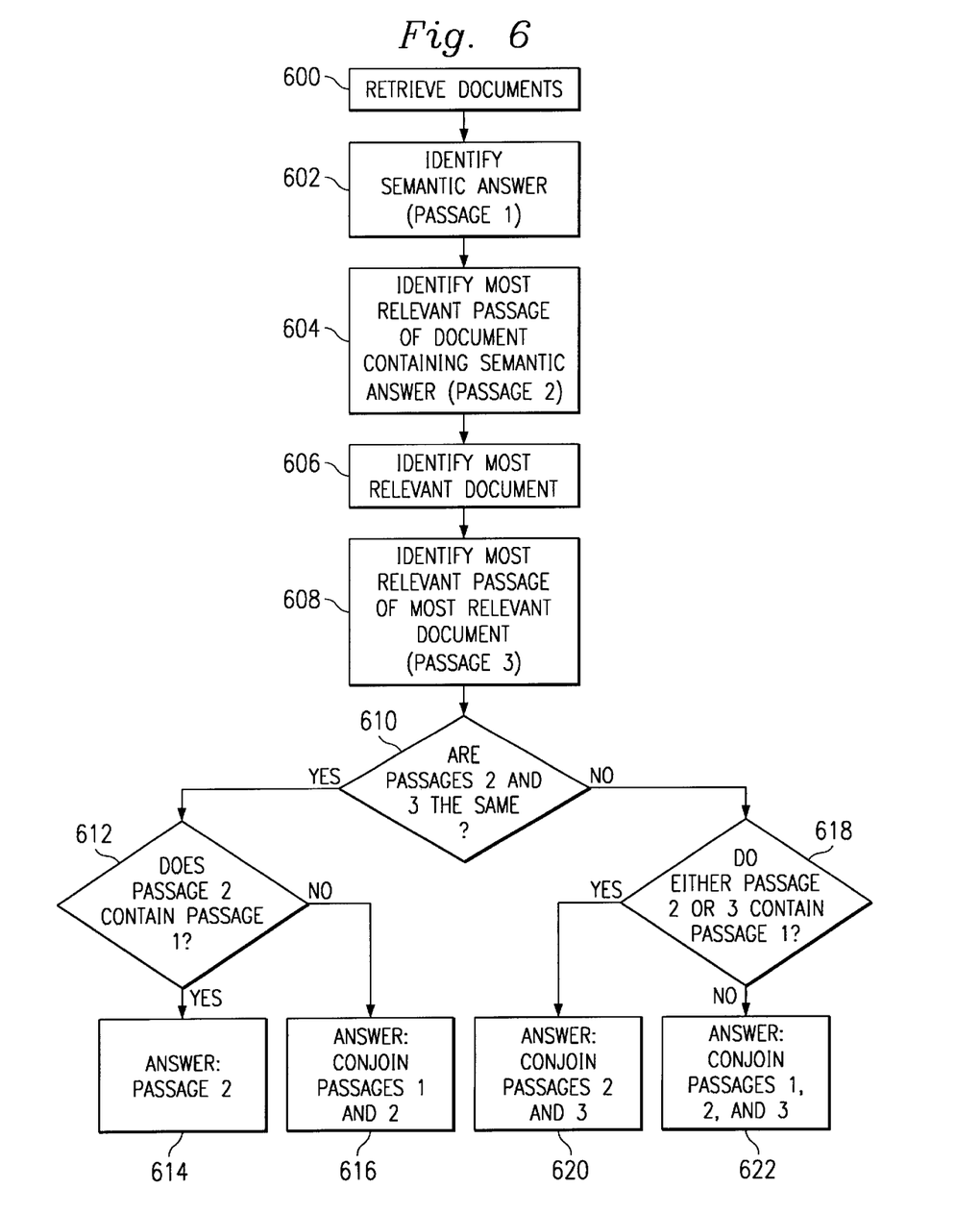
FIG. 6 is a flow chart illustrating an exemplary process for combining partial answers into a single answer.

Referring now to FIG. 6, the solution to this problem is to consider a final answer as possibly comprising three parts. In step 600, a group of documents is retrieved, either through the retrieval process described above or through some other process. In step 602, a semantic answer (passage 1) such as person, place, time, or instrument is identified in the group of documents using the signature based processing already described, although other processing techniques may be utilized. In step 604, the most relevant passage of the document in which the semantic answer was found is identified (passage 2). In strong answers, this passage will actually contain the semantic answer. The most relevant document of the set of documents is identified in step 606. The most relevant passage of the most relevant document retrieved overall (passage 3) is identified in step 608, which will be the first document retrieved during pass 1, since pass 1 uses the most constrained query, and search engines return documents in descending order of relevance. In some cases, this passage will be the same as passage 2 identified in step 604 above.

When the passages 2 and 3 are determined to be the same passage in step 610, and passage 2 contains passage 1 as determined in step 612, then the best answer can be concisely expressed as passage 2 alone, as illustrated in step 614. However, when passages 2 and 3 are the same, but passage 2 does not contain passage 1, then the answer is expressed by conjoining passages 1 and 2, as illustrated in step 616. When passages 2 and 3 are determined in step 610 to be different, and one or both contain passage 1 as determined in step 618, the answer is a conjoining of passages 2 and 3, as illustrated in step 620. When passages 2 and 3 are different, and neither contains passage 1, the answer is a conjoining of all three, as illustrated in step 622. If passages 2 and 3 are limited to sentence-length fragments, the answer can still be quite concise while covering all bases safely and transparently. In this way, multiple partial answers may be combined to form a more complete single answer.

In yet another alternative embodiment, the IR query sequence 308 may implement a less restrictive original query ir(nlp(Q)) which produces too many documents. A large number of documents suggests that the ir(nlp(Q)) query posed was not focused enough, and the query is fortified either by adding more search-terms (i.e., those terms used in the question which were not used in the initial query), or by increasing the restrictiveness of the query operators (e.g., replacing an #or choice operator with a more demanding #and operator).

In still another embodiment, additional passes beyond the four passes discussed in the example may be used to further refine the query ir(nlp(Q)). Alternatively, the maximum number of passes may be fewer than four if the results are satisfactory for the purpose of the search process.

In yet another alternative embodiment, the EBR process may be excluded entirely from the query process and an initial query ir(nlp(Q)) utilized without first comparing the query against an exemplar question set.

In another embodiment, a composite answer may be constructed from documents located using a multiple iteration query process.

It is further understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

I claim:

1. A method for processing a document comprising a plurality of words to extract an answer from the document, the method using a plurality of signatures and a plurality of rules based on the signatures, the method comprising:
    establishing the plurality of signatures;
    establishing the plurality of rules, each rule including
        a name formed by concatenating the signatures included in the rule;
        a concept, the concept assignable to the combination of signatures included in the scope of the rule;
    parsing the plurality of words;
    assigning a signature to each of the plurality of words;
    assigning a window, the window including a parameter defining the number of signatures viewable at one time;
    moving the window if applicable, so that the window reveals signatures not viewable in its previous position;
    reading the signatures viewable in the window;
    creating a rule name by concatenating the read signatures;
    comparing the created rule name to the names of the plurality of rules;
    determining whether the created name matches any of the rule names;
    applying the matching rule to create a concept if a matching rule exists; and assigning the concept back into the window.

2. The method of claim 1 further including a rule operable to assign a conceptual position in a concept ontology to the combination of signatures included in the rule.

3. The method of claim 2 further including a rule operable to assign a signature to the combination of signatures in order to replace the combination with a single signature.

4. The method of claim 1 wherein a word is assigned a conceptual signature, so that the word is associated with a concept in the concept ontology.

5. The method of claim 1 wherein the word is assigned an orthographic signature, so that the word is associated with its orthographic form.

6. The method of claim 1 further including representing each rule as a frame, where the frame is a named object.

7. The method of claim 1 further including a rule comprising a leftmost element and a rightmost element, where at least one of the elements is the product of another rule.

8. A computer system, connectable to a network, the network capable of accessing a search engine and a group of documents, for extracting information using a pipe-lined finite-state architecture including a plurality of signatures and signature based rules, the system including software for processing the documents comprising a plurality of words to extract an answer from the documents, the software comprising instructions for
    parsing the plurality of words from a document in the set of documents;
    assigning a signature to each of the plurality of words;
    reading the signatures;
    creating a rule name by concatenating the read signatures;
    comparing the created rule name to the names of the plurality of rules;
    determining whether the created name matches any of the rule names;
    applying the matching rule to create a concept if a matching rule exists; and assigning the concept back into the window.

9. The system of claim 8 further including instructions for a rule operable to assign a conceptual position in a concept ontology to the combination of signatures included in the rule.

10. The system of claim 9 further including instructions for a rule operable to assign a signature to the combination of signatures in order to replace the combination with a single signature.

11. The system of claim 8 wherein a word is assigned a conceptual signature, so that the word is associated with a concept in the concept ontology.

12. The system of claim 8 wherein the word is assigned an orthographic signature, so that the word is associated with its orthographic form.

13. The system of claim 8 further including instructions for representing each rule as a frame, where the frame is a named object modifiable at run time.

14. The system of claim 13 further including instructions for each frame comprising at least one named slot, where each slot includes a set of reference names to other frames.

15. The system of claim 14 further including instructions for cross linking a plurality of frames via their respective slots to create a concept network, the concept network providing a layer of meaning dependent on the interconnection of the frames.

16. The method of claim 8 further including a rule comprising a leftmost element and a rightmost element, where at least one of the elements is the product of another rule.

17. A method for combining a plurality of partial answers in a group of documents into a single answer, each document comprising a plurality of passages, the method comprising:
    retrieving a subset of documents from the group of documents, the subset comprising documents which include at least one partial answer;
    identifying a semantic answer in a document in the subset of documents;
    identifying a first most relevant passage in the document containing the semantic answer;
    identifying a most relevant document in the subset of documents;
    identifying a second most relevant passage in the most relevant document;

determining whether the first most relevant passage and the second most relevant passage are the same passage;

determining whether the first most relevant passage includes the semantic answer if the first most relevant passage and the second most relevant passage are the same passage;

forming the single answer by conjoining the semantic answer and the first most relevant passage if the first most relevant passage does not include the semantic answer; and selecting the first most relevant passage as the single answer if the first most relevant passage includes the semantic answer.

18. The method of claim 17 further including determining whether the first most relevant passage contains the semantic answer;

determining whether the second most relevant passage contains the semantic answer;

forming the single answer by conjoining the semantic answer, the first most relevant passage, and the second most relevant passage if neither the first most relevant passage nor the second most relevant passage contain the semantic answer; and forming the single answer by conjoining the first most relevant passage and the second most relevant passage if either the first most relevant passage or the second most relevant passage contain the semantic answer.

19. A computer system, connectable to a network, the network capable of accessing a search engine and a group of documents, for extracting information using a pipe-lined finite-state architecture, the system including software for searching combining a plurality of partial answers in the group of documents into a single answer, each document comprising a plurality of passages, the software comprising instructions for retrieving a subset of documents from the group of documents, the subset comprising documents which include at least one partial answer;

identifying a semantic answer in a document in the subset of documents;

identifying a first most relevant passage in the document containing the semantic answer;

identifying a most relevant document in the subset of documents;

identifying a second most relevant passage in the most relevant document;

determining whether the first most relevant passage and the second most relevant passage are the same passage;

determining whether the first most relevant passage includes the semantic answer if the first most relevant passage and the second most relevant passage are the same passage;

forming the single answer by conjoining the semantic answer and the first most relevant passage if the first most relevant passage does not include the semantic answer; and selecting the first most relevant passage as the single answer if the first most relevant passage includes the semantic answer.

20. The system of claim 19 further including instructions for determining whether the first most relevant passage contains the semantic answer;

determining whether the second most relevant passage contains the semantic answer;

forming the single answer by conjoining the semantic answer, the first most relevant passage, and the second most relevant passage if neither the first most relevant passage nor the second most relevant passage contain the semantic answer; and forming the single answer by conjoining the first most relevant passage and the second most relevant passage if either the first most relevant passage or the second most relevant passage contain the semantic answer.

* * * * *